(12) United States Patent　　　(10) Patent No.:　　US 9,002,064 B2
Bregler et al.　　　(45) Date of Patent:　　Apr. 7, 2015

(54) VISUAL TRACKING FRAMEWORK

(71) Applicant: Lucasfilm Entertainment Company Ltd., San Francisco, CA (US)

(72) Inventors: Christoph Bregler, New York, CA (US); Kiran S. Bhat, San Francisco, CA (US); Brett A. Allen, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

(21) Appl. No.: 14/071,380

(22) Filed: Nov. 4, 2013

(65) Prior Publication Data

US 2014/0219499 A1　　Aug. 7, 2014

Related U.S. Application Data

(63) Continuation of application No. 12/607,480, filed on Oct. 28, 2009, now Pat. No. 8,649,555.

(60) Provisional application No. 61/153,604, filed on Feb. 18, 2009.

(51) Int. Cl.
　　*G06K 9/00*　　(2006.01)
　　*G06K 9/32*　　(2006.01)
　　*G06T 7/20*　　(2006.01)
　　*G06K 9/36*　　(2006.01)

(52) U.S. Cl.
　　CPC ........ *G06K 9/00624* (2013.01); *G06K 9/00248* (2013.01); *G06K 9/3216* (2013.01); *G06K 2009/3225* (2013.01); *G06K 2009/366* (2013.01); *G06T 7/2046* (2013.01); *G06T 2207/30201* (2013.01); *G06T 2207/30204* (2013.01)

(58) Field of Classification Search
　　None
　　See application file for complete search history.

(56) References Cited

U.S. PATENT DOCUMENTS

| | | | | |
|---|---|---|---|---|
| 5,802,203 A | * | 9/1998 | Black et al. | 382/173 |
| 5,802,220 A | * | 9/1998 | Black et al. | 382/276 |
| 5,802,361 A | * | 9/1998 | Wang et al. | 382/217 |
| 5,847,716 A | * | 12/1998 | Hashimoto | 345/473 |
| 5,982,930 A | * | 11/1999 | Neff et al. | 382/209 |
| 6,173,066 B1 | * | 1/2001 | Peurach et al. | 382/103 |

(Continued)

OTHER PUBLICATIONS

Bregler, et al. "Turning to the Masters: Motion Capturing Cartoons", ACM Transactions on Graphics (TOG)—Proceedings of ACM Siggraph 2002, vol. 21 Issue 3, Jul. 2002 pp. 399-407.

(Continued)

*Primary Examiner* — Avinash J Yentrapati
(74) *Attorney, Agent, or Firm* — Kilpatrick Townsend & Stockton LLP

(57) ABSTRACT

A computer program product tangibly embodied in a computer-readable storage medium includes instructions that when executed by a processor perform a method. The method includes identifying a frame of a video sequence, transforming a model into an initial guess for how the region appears in the frame, performing an exhaustive search of the frame, performing a plurality of optimization procedures, wherein at least one additional model parameter is taken into account as each subsequent optimization procedure is initiated. A system includes a computer readable storage medium, a graphical user interface, an input device, a model for texture and shape of the region, the model generated using the video sequence and stored in the computer readable storage medium, and a solver component.

25 Claims, 8 Drawing Sheets

(56) References Cited

U.S. PATENT DOCUMENTS

| | | | |
|---|---|---|---|
| 6,268,864 B1 | 7/2001 | Chen et al. | |
| 6,301,370 B1* | 10/2001 | Steffens et al. | 382/103 |
| 6,526,156 B1* | 2/2003 | Black et al. | 382/103 |
| 6,574,353 B1* | 6/2003 | Schoepflin et al. | 382/103 |
| 6,597,801 B1 | 7/2003 | Cham et al. | |
| 6,658,149 B1* | 12/2003 | Wakahara et al. | 382/215 |
| 7,313,266 B2* | 12/2007 | Ishiyama | 382/154 |
| 7,403,202 B1* | 7/2008 | Nash | 345/474 |
| 7,440,587 B1* | 10/2008 | Bourdev | 382/103 |
| 7,536,030 B2* | 5/2009 | Wang et al. | 382/103 |
| 7,657,060 B2* | 2/2010 | Cohen et al. | 382/103 |
| 2001/0033675 A1* | 10/2001 | Maurer et al. | 382/103 |
| 2003/0035592 A1 | 2/2003 | Cornog et al. | |
| 2003/0081813 A1* | 5/2003 | Astle | 382/103 |
| 2003/0219146 A1* | 11/2003 | Jepson et al. | 382/103 |
| 2004/0021660 A1* | 2/2004 | Ng-Thow-Hing et al. | 345/419 |
| 2004/0051711 A1 | 3/2004 | Dimsdale et al. | |
| 2004/0062424 A1* | 4/2004 | Mariani et al. | 382/118 |
| 2007/0183629 A1 | 8/2007 | Porikli et al. | |
| 2007/0297645 A1* | 12/2007 | Pace | 382/103 |
| 2008/0170777 A1 | 7/2008 | Sullivan et al. | |
| 2009/0169053 A1 | 7/2009 | Vendrig | |
| 2009/0324018 A1* | 12/2009 | Tell | 382/103 |
| 2010/0013832 A1* | 1/2010 | Xiao et al. | 345/420 |
| 2010/0111370 A1* | 5/2010 | Black et al. | 382/111 |
| 2010/0259546 A1* | 10/2010 | Yomdin et al. | 345/473 |

OTHER PUBLICATIONS

Coates, et al. "Active Appearance Models", IEEE Transactions on Pattern Analysis and Machine Intelligence, vol. 23, No. 6, Jun. 2001 pp. 681-685.

Mathews, et al. "Active Appearance Models Revisited", Journal International Journal of Computer Vision, vol. 60 Issue 2, Nov. 2004, pp. 135-164.

\* cited by examiner

VISUAL TRACKING FRAMEWORK

CROSS-REFERENCES TO RELATED APPLICATIONS

This application is continuation of U.S. application Ser. No. 12/607,480, filed on Oct. 28, 2009; which claims the benefit of U.S. Provisional Application Ser. No. 61/153,604, filed on Feb. 18, 2009. The contents of Ser. No. 12/607,480 and 61/153,504 are hereby incorporated by reference in their entirety.

TECHNICAL FIELD

This document relates to graphics processing.

BACKGROUND OF THE INVENTION

Diversity of captured footage and accuracy requirements make the feature tracking problem very challenging. For instance, typical background footage exhibits drastic changes in lighting, motion blur, occlusions, and is usually corrupted with environment effects such as smoke or explosions. Tracking features on hero characters such as a human faces is equally challenging, especially near the eyes and lips, where the textures change continuously.

Existing commercial tracking packages can provide automatic approaches for identifying and tracking markers though a sequence. These tools may be very powerful in some situations, but can encounter strong temporal discontinuities such as occlusions or lighting flashes. Such "outlier" situations can be common in VFX work. Another class of trackers are single-marker systems, based on fast template matching algorithms. They can have a sophisticated user interface that provides manual controls to assist and guide the trackers through complex shots. However, because single-marker systems focus on individual features and not regions, they can have difficulty handling large-scale image motions such as scaling, rotation, blurring and large deformations of the image regions.

BRIEF SUMMARY OF THE INVENTION

In a first aspect, a computer program product tangibly embodied in a computer-readable storage medium includes instructions that when executed by a processor perform a method. The method includes identifying a frame of a video sequence on which to perform region tracking for a region defined using markers in another frame of the video sequence, wherein a model for the region has been generated using the video sequence. The method includes transforming the model into an initial guess for how the region appears in the frame. The method includes performing an exhaustive search of the frame using the transformed model, the exhaustive search resulting in the transformed model being associated with a first location in the frame. The method includes performing a plurality of optimization procedures following the exhaustive search, each optimization procedure beginning at a frame location determined by a previous procedure and seeking to optimize a match between a model transformation and the frame with regard to at least one model parameter, wherein at least one additional model parameter is taken into account as each subsequent optimization procedure is initiated, the optimization procedures resulting in a final model transformation being associated with a second location in the frame. The method includes recording the final model transformation and the second location as an outcome of tracking the region in the frame.

Implementations can include any or all of the following features. Transforming the model can include interpolating positions of the markers from the other frame and from at least one additional frame of the video sequence where the region has already been tracked; and generating the transformed model by estimating an affine transformation based on the interpolated positions. The model can be based on user-selected positions for the markers in multiple reference frames of the video sequence, and the model can include an average image and multiple component images, the average image representing an average appearance of the region in the reference frames, and each of the component images representing differences between the reference frames and the average image. The exhaustive search can include placing the transformed model at all possible offsets within the frame; calculating normalized cross-correlation values for the possible offsets, each of the normalized cross-correlation values corresponding to a correlation between the transformed model and the frame at one of the possible offsets; and selecting a maximum of the normalized cross-correlation values as the first location.

Directly after the exhaustive search the method can include performing a first optimization procedure with regard to translation and contrast. The first optimization procedure can further take into account brightness. After the first optimization procedure the method can include performing a second optimization procedure with regard also to rotation and uniform scale. After the second optimization procedure the method can include performing a third optimization procedure with regard to full affine and appearance model parameters. At least one of the plurality of optimization procedures can add a degree of freedom in optimization that includes a constant graylevel offset to pixel values in the transformed model. At least one of the plurality of optimization procedures can add a degree of freedom in optimization that includes a constant graylevel multiplier to pixel values in the transformed model.

The method can further include performing an additional optimization procedure that allows each of the markers to undergo controlled perturbation beyond the transformed model. The controlled perturbation can include variation of at least one of marker location and graylevel appearance beyond the transformed model.

The method can further include defining, for the controlled perturbation of a first marker, at least a second marker to be a herding marker for the first marker; wherein the additional optimization procedure, in performing the controlled perturbation on the first marker, takes into account how the controlled perturbation affects the second marker.

The method can further include detecting failure in at least one of the plurality of optimization procedures; and in response to the failure, reverting to an intermediate model transformation that was obtained in a directly preceding optimization procedure. A user can select multiple reference frames of the video sequence, and the method can further include generating morph images between the reference frames, each morph image representing an intermediate appearance of the region; generating the model using the reference frames and the morph images before performing the exhaustive search and the plurality of optimization procedures.

The method can further include selecting where among the reference frames to generate the morph images by: identifying a total number of the morph images to be generated;

computing, for every pair of the reference images, a distance value representing how much the pair of reference images differ with respect to shape change and graylevel change; adding the distance values to form a total distance value; dividing the total distance value by the total number of the morph images to obtain a per-morph-image distance value; and distributing the morph images among the reference frames based on the distance values and the per-morph-image distance value.

The method can further include detecting that another frame from the video sequence is being added to the reference frames; and regenerating the model using the morph images and the reference frames including the other frame.

The region can be tracked as a convex hull of the markers. A user can place the markers in the other frame under guidance of a graphical user interface to define the region. At least a first marker may have been tracked in the video sequence before the region is tracked, and the method can further include receiving a user input defining the first marker as an anchor marker; and performing the tracking of the region taking into account the anchor marker. The user can modify the number of the markers, and wherein the model is regenerated for the modified number of markers.

In a second aspect, a system includes a computer readable storage medium having stored therein a video sequence comprising multiple frames, some of which are selected as references frames. The system includes a graphical user interface for presenting any of the multiple frames. The system includes an input device with which a user places markers on each of the reference frames under guidance of the graphical user interface to define a region in the reference frames that undergoes deformation in the video sequence, wherein the system tracks the region in a frame of the multiple frames. The system includes a model for texture and shape of the region, the model generated using the video sequence and stored in the computer readable storage medium. The system includes a solver component implemented in the computer readable storage medium, the solver component transforming the model into an initial guess for how the region appears in the frame, performing an exhaustive search of the frame resulting in the transformed model being associated with a first location in the frame, and performing a plurality of optimization procedures following the exhaustive search, each optimization procedure beginning at a frame location determined by a previous procedure and seeking to optimize a match between a model transformation and the frame with regard to at least one model parameter, wherein at least one additional model parameter is taken into account as each subsequent optimization procedure is initiated, the optimization procedures resulting in a final model transformation being associated with a second location in the frame.

The details of one or more implementations are set forth in the accompanying drawings and the description below. Other features and advantages will be apparent from the description and drawings, and from the claims.

DETAILED DESCRIPTION OF THE INVENTION

Figure 1:
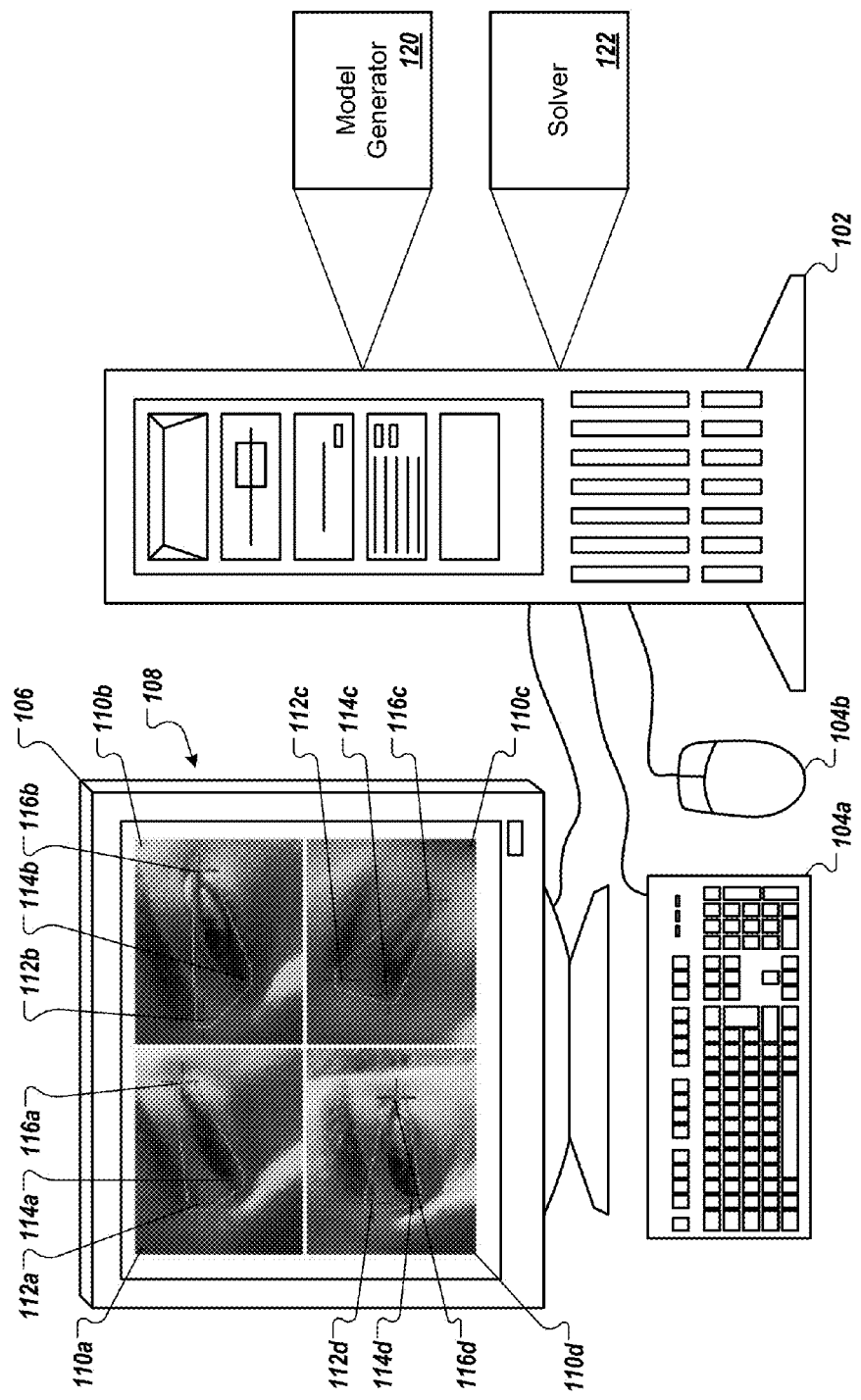
FIG. 1 shows an example of a system for tracking features associated with a video sequence.

FIG. 1 is a schematic diagram of an example of a system 100 that in some implementations can be used for tracking features associated with a video sequence. Tracking features on film footage may be useful for applications related to visual effects, such as camera calibration, matchmoving, photomodeling, vision-based motion capture (with or without markers), and/or object tracking, to name a few possibilities. Tracking of patterns that change appearance over two or more frames, for example, can be performed and/or improved using a shot-specific model. For example, a tracker can internally maintain an adaptable texture and shape model which deforms and adapts its appearance to track the footage. The adaptable template can be learned from a subset of example frames in the video sequence that are specified interactively by a user. Tracking with an adaptable template can allow tracking through motion blur, and can handle drastic changes to the size, orientation, lighting, and complex texture variations. A tracking algorithm may be provided that includes at least a training step and a tracking step, for example. The training step can include learning a shot-specific adaptable template. The tracking step can include a multi-pass search that adapts a texture and shape model to the current frame.

The system 100 in this example includes a computer system 102 and components including any kind of input devices 104*a*, 104*b* (e.g., keyboards, computer mice, graphics tablets, gesture tracking systems, etc.), and a video display device 106. Any kind of computer system can be used, including, but not limited to, computer servers, personal computers, and mobile computing devices. The computer system 102 and components in the system 100 can be connected by any kind of network, such as a private wired or wireless network or a public network such as the Internet. In some implementations, one or more components in the system 100, such as any of the input devices 104 and/or the video display device 106, can be peripheral devices controlled by the computer system 102. In some implementations, components in the system 100 can include integrated computer systems enabling decentralized control and an ability for components to communicate with each other directly.

A video sequence (e.g., film footage) may exhibit changes in lighting, motion blur, and occlusions between individual frames or from one scene to another, and may include environmental effects such as smoke or explosions, to name a couple of possibilities. In some implementations, one or more reference frames can be used for tracking features in a video sequence. For example, the reference frames can be selected to reflect a range of conditions related to the video sequence, such as lighting conditions, states of a visible object (e.g., an eyelid state, a change in feature or texture, etc.), and motion blur, to name a few examples. The video sequence may be provided to the video display device 106 by the computer system 102 or by another source. The video display device 106 in this example can store the video sequence including multiple frames. Some of the frames included in the video sequence may be selected as reference frames (e.g., reference frames 110*a*, 110*b*, 110*c*, and 110*d*). For example, the reference frames (e.g., frames 110a-d) can be chosen by a user of the system 100 as being particularly representative of varying visual conditions that occur in the sequence. The video sequence may initially have been created using the computer system 102, for example using an attached camera device, or may have been transferred to the computer system from another device that captured the sequence.

In some implementations, the video display device 106 can include a frame presentation area 108 that can display one or more reference frames (e.g., frames 110a-d). For example, the frame presentation area 108 can be included in a graphical user interface presented by the video display device 106. The graphical user interface, for example, can be generated by a computer program product tangibly embodied in a computer-readable storage medium (e.g., a program stored and executed by the computer system 102). For example, the computer program product can include instructions for generating the graphical user interface and instructions for providing additional operations.

In some implementations, the user of the system 100 can place one or more markers (e.g., markers 112a-d, 114a-d, and 116a-d) on each of the reference frames 110a-d to define an image feature in the reference frames that undergoes deformation in the video sequence. The user chooses the image feature based on what the user wishes to track in the sequence and applies the markers accordingly. For example, the image feature can be a region of a human face, such as a region near the eyes or lips. As another example, the image feature can be a region of background footage. The markers 112a-d, 114a-d, and 116a-d, for example, may be placed by a user of the system 100 by interacting with any of the input devices 104. In some implementations, visual feedback can be presented at the video display device 106 to assist the user while placing one or more markers. For example, footage can be presented to the user and the user can interactively stop the footage at any time to place or change the position of tracking markers.

In some implementations, an anchoring mechanism can be implemented for use when one or more markers are tracked. For example, anchored markers may be configured so that they are not modified by subsequent tracking. As another example, anchored frames may be ignored during a determination of reference frames (i.e., the user marks references on the non-anchored frames). Anchored markers can assist a tracker's initialization process and can guide the tracker away from incorrect regions, for example.

In the present example, the markers 112a-d, 114a-d, and 116a-d on the reference frames 110a-d can represent corresponding image locations, i.e., marker 112a on frame 110a may correspond with marker 112b on frame 110b; both markers may correspond with marker 112c on frame 110c, etc. A group of markers (e.g., markers 112a, 114a, and 116a) can, for example, define an image feature (e.g., a region associated with a shape, texture, etc.) in the reference frames. For example, the image feature may undergo deformation in the video sequence. In the present example, the region of reference frame 110a defined by markers 112a, 114a, and 116a may correspond with the region of reference frame 110b defined by markers 112b, 114b, and 116b; both regions may correspond with the region of reference frame 110c defined by markers 112c, 114c, and 116c, etc.

In some implementations, markers (e.g., markers 112a-d, 114a-d, and 116a-d) can be recorded as part of performing multi-marker tracking relating to the video sequence. For example, features or regions defined by the markers may be tracked in one or more frames of the video sequence. In some implementations, single-marker tracking may be performed. For example, a subset of markers relating to a feature or region may be selected, or a single marker may be chosen. If a single marker is selected, for example, an affine tracker based on a single reference (e.g., the reference prior to the frame being tracked) can be used. In some implementations, one or more markers may be added to further define a feature or region.

The computer system 102 in this example includes a model generator 110 and a solver 112. In the present example, the model generator 110 and the solver 112 can be implemented as computer program products tangibly embodied in a computer readable medium. The model generator 110 and the solver 112 can include instructions that when executed by a processor (e.g., a processor of the computer system 102) perform various operations.

The model generator 110, for example, can generate a model for texture and shape of an image feature (e.g., an eye region as defined by marker group 112a, 114a, 116a, by marker group 112b, 114b, 116b, and by marker group 112c, 114c, 116c, etc.). Model generation can include the identification of one or more reference images. The reference images, for example, can reflect versions of the image feature from the reference frames. For example, referring to reference frame 110a, the image feature version may reflect a semi-closed eye; referring to reference frame 110b, the image feature version may reflect an open eye; referring to reference frame 110c, the image feature version may reflect a differently oriented and motion-blurred eye; referring to reference frame 110d, the image feature version may reflect a highly lit eye. Thus, the image region marked by the user can undergo deformation changes in texture and/or shape throughout the sequence.

Model generation can include generation of one or more morph images based on how the deformation changes the image feature between consecutive reference images or frames, for example. For example, each morph image can represent an intermediate appearance of the region between the reference frames. In some implementations, the model generator 100 can select where among the reference frames to generate the morph images. Any number of morph images can be used.

For example, a total number of morph images to be generated can be specified. For every pair of reference images, for example, a distance value can be computed representing how much the pair of reference images differ from each other with respect to some characteristic, such as shape change and graylevel change. The distance values can be added to form a total distance value. The total distance value can be divided by the total number of morph images to obtain a per-morph-image distance value. The morph images can then be distributed among the reference frames based on the respective distance values for the reference frames and the per-morph-image distance value. In some implementations, the subsequent tracking calculations may approximate interactive rates. In some implementations, a variable number of in-between morphs may be generated for each reference pair. For example, a constant number of shape deformations or gray-level differences can be sampled (e.g., by using either a L1 or L2 norm).

In some implementations, the reference images can be aligned (e.g., by the model generator) into a set of aligned images. For example, the reference images can be aligned such that the image feature in each of the aligned reference images has a common orientation. In some implementations, the reference images can be warped such that the images fit a canonical reference image (e.g., an average image, here defined by marker group 112b, 114b, and 116b). For example, an initial determination of an amount of warp can be based on reference frame marker positions. The marker positions can be determined from the reference frames and previously tracked frames, for example, and the positions can be interpolated at a current frame. A Bezier interpolation, or a linear interpolation, may be used, for example. From the interpreted marker positions, an affine transformation can be calculated from each of the references to the canonical reference image using least squares, for example. Each of the reference images can be warped according to the affine transformation, for example, and a warping algorithm can be used to warp the reference images to the shape of the largest reference image (including boundary points). Additional morphed samples can be produced by interpolating the reference frames, for example. The generated model can include, for example, a mean image and multiple model component images.

The solver 122, for example, can identify an initial fitting to the frame of the model for texture and shape of the image feature. In some implementations, the solver 122 can identify improved fittings of the model to the texture and shape of the image feature in iterations. For example, the improved fittings can include a combination of the mean image and one or more model component images according to the frame. The system 100, for example, can record markers for the frame based on the improved model fittings, the markers defining the image feature in the frame. In some implementations, models generated by the model generator 110 and fitted by the solver 112 can be used to track an image feature (e.g., the eye region) in the video sequence.

In some implementations, after a model is generated (e.g., by the model generator 110), one or more reference frames can be added to or removed from the set of reference frames (e.g., frames 110a-d). For example, additional reference frame(s) may be selected (e.g., by a user of the system 100) among multiple frames of the video sequence. Additional reference image(s) can be generated based on the additional reference frame(s), additional morph image(s) can be generated based on the additional reference image(s), and a new model can be generated (e.g., by the model generator 110) based on the additional reference and morph image(s). For example, the new model can include a new mean image and multiple new model component images.

In some implementations, after a model is generated, one or more markers can be added to or removed from the set of markers (e.g., any of the markers 112a-d, 114a-d, or 116a-d). For example, the markers may be added or removed by a user of the system 100 under the guidance of a graphical user interface. A new model can then be generated (e.g., by the model generator 110) based on the modified number of markers.

Figure 2:
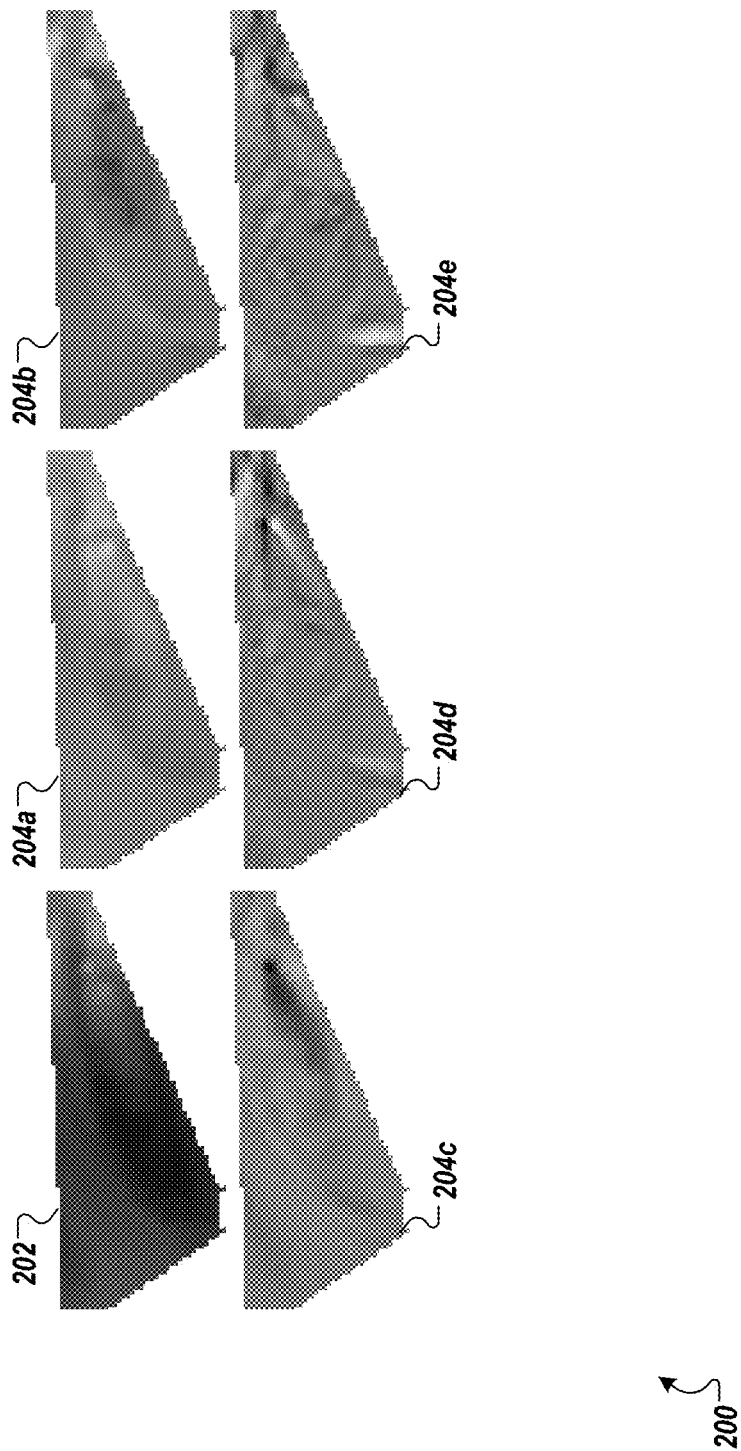
FIG. 2 shows an example representation of a model.

FIG. 2 shows an example representation of a model 200. For example, the model generator 110 (shown in FIG. 1) can calculate, based on the features marked by the user in FIG. 1, a mean image 202 and a series of model component images 204a, 204b, 204c, 204d, and 204e. More or fewer model component images may be calculated in other implementations; the model component images 204a-e are described here for exemplary purposes. The model 200 can represent texture and shape variations inside an image mask defined by a set of markers (e.g., the set of markers 112a, 114a, and 116a shown in FIG. 1). For example, each of the component images 204a-e can represent how that image feature in one of the reference frames differs from the calculated mean image 202.

In some implementations, the model component images 204a-e in the present example can be based on principal component analysis (PCA). For example, PCA can be used for dimension reduction. In some implementations, the model component images (e.g., images 204a-e) can be based on reference frames and morphed images between the frames. For example, the morphed images can be used to train a shot-specific PCA-based model. In some implementations, the morphed images may be aligned to each other before running PCA. For example, vectors used for PCA can include the pixel values from the aligned images and the X and Y coordinates of the markers used to generate the aligned images. To avoid biasing the PCA process, for example, the mean may be subtracted from each vector, and each element may be divided by its variance. In some implementations, the PCA step can be bypassed and weights for each of the morphed images can be determined.

Figure 3:
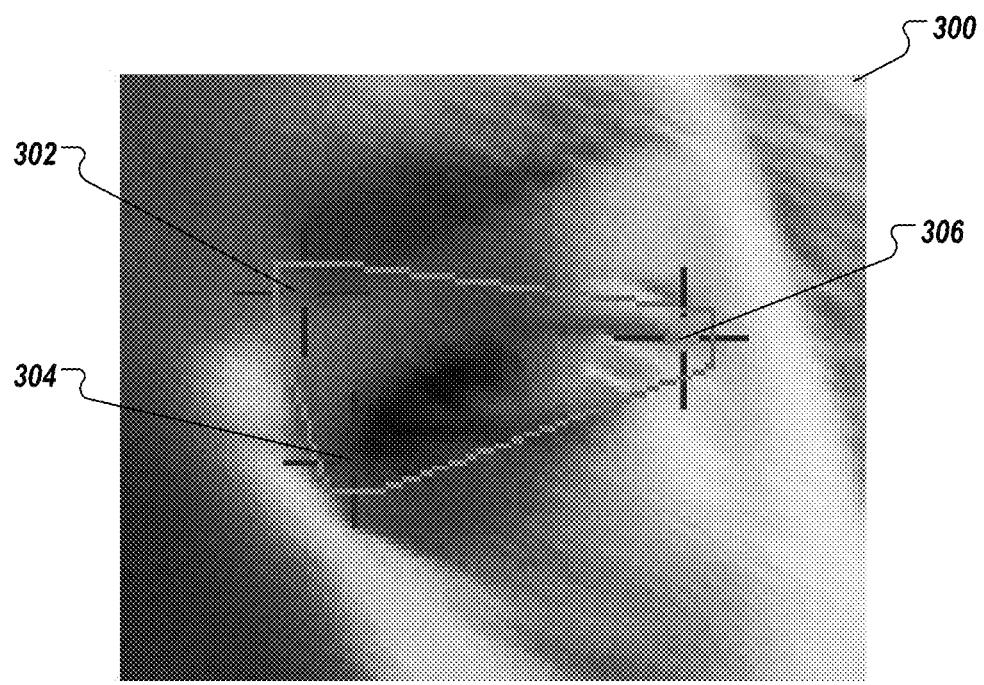
FIG. 3 shows an example of tracking markers on a video frame.

Using the generated model, the feature can be tracked in remaining frames of the sequence. FIG. 3 shows an example of tracking markers (e.g., markers 302, 304, and 306) on a video frame (e.g., frame 300). The frame 300 may, for example, be identified as a new frame (e.g., a non-reference frame or current frame) of the video sequence, and may include an image feature undergoing deformation (e.g., an eye) in the video sequence. The markers 302, 304, and 306 can represent image locations corresponding with image locations marked on any of the reference frames 110a-d (shown in FIG. 1), for example. In the present example, the marker 302 may correspond with markers 112a-d (shown in FIG. 1), the marker 304 may correspond with markers 114a-d, and the marker 306 may correspond with markers 116a-d. In some implementations, the region can be tracked as convex hull of the markers. For example, the shown polygon can form a convex hull of the markers 302-06.

In some implementations, the tracking markers can be associated with multiple points (e.g., three, four, etc.) and can be associated with an area including the points. For example, to locate a region to track, four points associated with each marker can be used to form a box of a particular size. The region to track, for example, can be a convex hull of all the markers. As another option, the areas inside the boxes can be tracked.

In some implementations, an optimization algorithm can be performed by the solver 122 (shown in FIG. 1) to determine the location of the image feature (e.g., the eye) in the new frame (e.g., frame 300). For example, the solver 122 may determine locations for markers 302, 304, and 306. In some implementations, the tracking stage can be implemented as a multi-pass search that adapts a model to the new frame. For example, the solver 122 can perform an algorithm to fit the model 200 (shown in FIG. 2) to the frame 300. In some implementations, the initial fitting can include a global normalized cross-correlation based fitting. For example, a normalized cross-correlation-based search with a warped template can be used to find an initial translation. In the present example, the previously calculated affine transformation (e.g., the transformation based on the reference images and the canonical reference image) can be applied to the mean image 202 (shown in FIG. 2) to obtain a template image and a mask. For example, the mask can indicate which pixels in a rectangular region are part of the template. For potential offsets of the template within a search region, a calculation of the normalized cross-correlation can be performed, and the offset with the lowest normalized cross-correlation can be selected, for example. In some implementations, the selected offset can be used as the initial transformation in subsequent process steps.

In some implementations the solver 122 can perform an algorithm to determine improved fittings of the model 200 to the texture and shape of the image feature (e.g., the eye) in multiple iterations. In the present example, each of the improved fittings can include a combination of the mean image 202 and the model component images 204a-e (shown in FIG. 2) according to the frame. The markers 302, 304, and 306, defining the image feature (e.g., the eye), for example, can be recorded for the frame 300 based on the improved fittings of the model 200.

Figure 4:
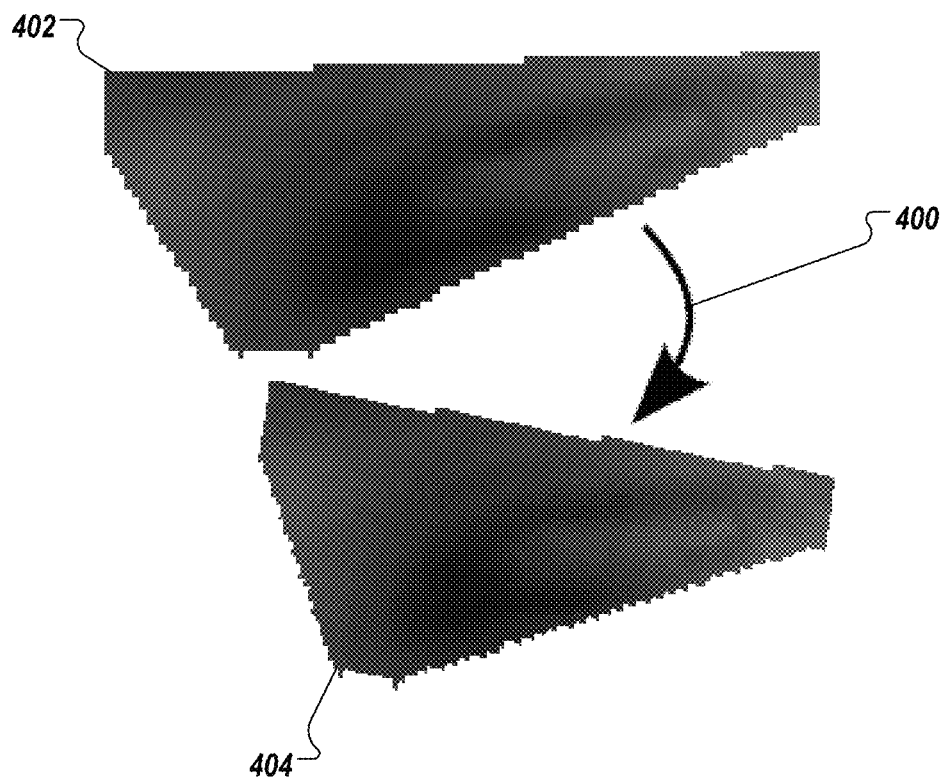
FIG. 4 shows an example of constructing a pattern that matches the video frame.

FIG. 4 shows an example of constructing a pattern 404 for matching a video frame. In the present example, the pattern 404 can be used for locating a reference image (e.g., the eye) in the frame 300. For example, determining the initial fitting and the improved fittings can include determining weights for each of the component images 204a-e (shown in FIG. 2) to match the model 202 (shown in FIG. 2) to the image feature in the frame. For example, a normalized model 402 may represent elements or combinations of the mean image 202 and the model component images 204a-e. As shown by transformation arrow 400, improved fittings (e.g., as performed by the solver 122) of the model 402 can provide the pattern 404.

Improved fittings can include fitting an affine deformation and a linear combination of texture bases of the model to the image feature (e.g., the eye). For example, the affine shape deformation can include a combination of affine and base shape deformations. In some implementations, the affine model can include at least six model parameters, including two translation parameters, two scaling parameters, a shearing parameter, and a rotation parameter, for example.

The improved fittings can be determined using an optimization process applied in iterations, for example. In some implementations, the optimization (e.g., a Newton Step optimization) can be performed in a series of steps. For example, a step can be performed including a determined mean image (e.g., mean image 202) used to solve for an object translation and contrast using an exhaustive search. That is, all possible translations for the mean image can be tried against the current frame, optionally varying contrast of the mean image as well. As another example, a search step taking into account translation, rotation and uniform scale and contrast can be performed. As another example, a search step including full affine and appearance model parameters for the mean image can be performed. Thus, one or more optimization steps can be performed. If multiple steps are performed, each step can begin with the outcome of a previous procedure (e.g., the result of a previous optimization or of an exhaustive search) and seek to optimize it further.

In some implementations, an additional Newton search can be performed for each marker. For example, the additional search can be performed while allowing one or more out-of-space deformations beyond the current boundary or boundaries of the model for the tracked region. Examples of this will be described with regard to FIG. 6 below.

In some implementations, the fitting algorithm can fall back to an earlier step (e.g., the last successful step) if a later step fails. Various criteria can be used to trigger a fallback to a previous step, such as if a Newton step diverges, or if the template scale increases or decreases by a specified factor (e.g., 2, 3, 5, etc.) or more, to name a few examples. Falling back can involve taking the most recently obtained result and using it in a next optimization procedure, thus effectively bypassing the failed optimization. As another example, after taking the most recently obtained result the optimization procedures can be ended. In some implementations, one or more steps may be omitted or performed in a different order. For example, if a single marker is selected, the search step including full affine and appearance model parameters and the additional Newton search may be omitted.

In some implementations, one or more markers can be analyzed separately after previous processing and can be refined individually. For example, this can allow a visual tracking framework to pinpoint the position of an individual marker. In some implementations, linear weights of the model component images (e.g., model component images 204a-e) can be optimized. In some implementations, a tracking algorithm (e.g., as performed by the solver 122) can optimize for contrast and brightness changes.

Figure 5:
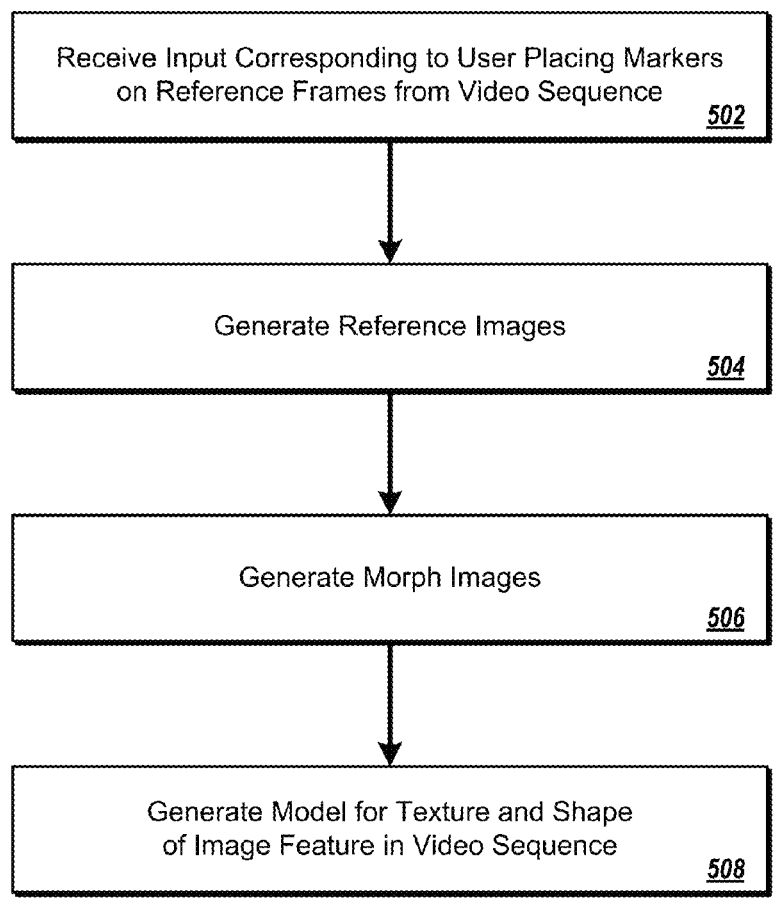
FIG. 5 shows an example of a process for generating a model for an image feature in a video sequence.

FIG. 5 shows an example of a process 500 for generating a model for an image feature in a video sequence. In some implementations, the process 500 can be performed in the system 100, for example by a processor executing instructions from a computer readable storage device. More or fewer steps can be performed; as another example, one or more steps can be performed in another order.

The process 500 can include a step 502 for receiving input corresponding to a user placing one or more markers (e.g., any of the markers 112a-d, 114a-d, or 116a-d, as shown in FIG. 1) on one or more reference frames (e.g., any of the reference frames 110a-d, as shown in FIG. 1) from a video sequence. For example, the markers may define an image feature in the reference frames that undergoes deformation in the video sequence.

The process 500 can include a step 504 for generating reference images. For example, the reference images can be based on input such as the input received in step 504. In some implementations, each reference image can include a version of the image feature from one of the reference frames.

The process 500 can include a step 506 for generating morph images. For example, the morph images can represent how the deformation of the image feature changes the texture and shape of the image feature between consecutive reference Images.

The process 500 can include a step 506 for generating a model for the texture and shape of the image feature in the video sequence. For example, the model can be based on the reference images generated in step 504 and the morph images generated in step 506. In some implementations, the model can include a mean image and multiple model component images.

Figure 6:
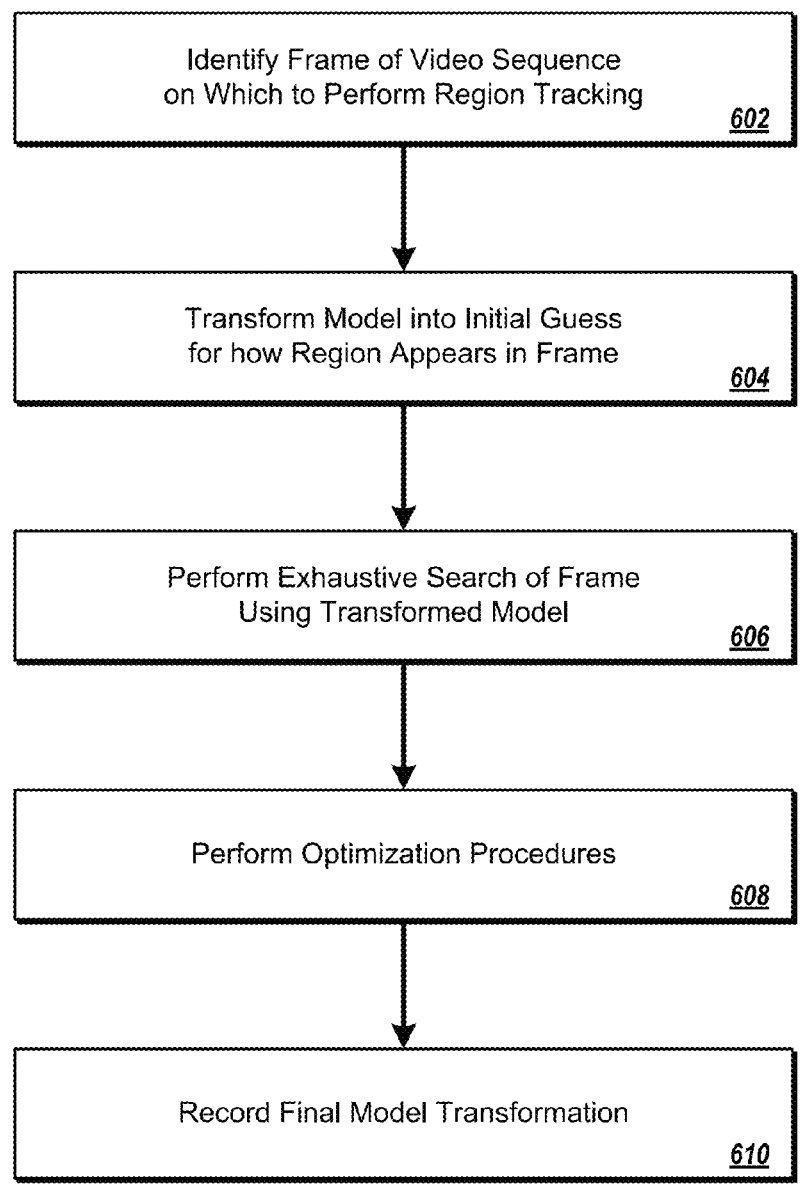
FIG. 6 shows an example of a process for tracking a region in a video sequence.

FIG. 6 shows an example of a process 600 for tracking a region in a video sequence. In some implementations, the process 600 can be performed in the system 100, for example by a processor executing instructions from a computer readable storage device. More or fewer steps can be performed; as another example, one or more steps can be performed in another order.

The process 600 can include a step 602 for identifying a frame of a video sequence on which to perform region tracking. For example, the region tracking can be performed for a region defined using markers in another frame (e.g., any of the reference frames 110a-d, as shown in FIG. 1) of the video sequence. A model (e.g., the model 200, as shown in FIG. 2) for the region may previously have been generated using the video sequence, for example, and may be based on user-selected positions for the markers in multiple reference frames of the video sequence. The model, for example, includes an average image and multiple component images, the average image representing an average appearance of the region in the reference frames, and each of the component images representing differences between the reference frames and the average image.

The process 600 can include a step 604 (e.g., as performed by the solver 122, shown in FIG. 1) for transforming the model into an initial guess for how the region appears in the frame. For example, the model transformation can include an interpolation (e.g., a Bezier interpolation, linear interpolation, etc.) of the marker positions from the reference frame and from at least one additional frame of the video sequence where the region has already been tracked. For example, the transformed model can be generated by estimating an affine transformation based on the interpolated marker positions. For example, from the interpolated marker positions, an affine transformation relative to the average image can be estimated using least squares. In a sequence of frames, for example, marker positions from previously tracked frames can be used as factors in determining the initial guess. The initial guess, for example, can include a representation of rotation, scale, and shear of the region from the model average.

The process 600 can include a step 606 for performing (e.g., by the solver 122 using a fast Fourier transform) an exhaustive search of the frame using the transformed model. For example, the exhaustive search can result in the transformed model being associated with an initial frame location. The exhaustive search, for example, can be translational, and can include placing the transformed model at all possible offsets within the frame and calculating normalized cross-correlation values for the possible offsets. Each of the normalized cross-correlation values, for example, can correspond to a correlation between the transformed model and the frame at one of the possible offsets. In some implementations, the normalized cross-correlation values can be based on a comparison of pixel values (e.g., color, grayscale, etc.) of the transformed model and one of the offsets. A high normalized cross-correlation (e.g., values approaching 1), for example, can indicate a match or a near match between the transformed model and one of the offsets. The offset associated with a maximum of the normalized cross-correlation values can be selected as the initial frame location, for example.

The process 600 can include a step 608 for performing (e.g., by the solver 122) a plurality of optimization procedures (e.g., Newton Step optimization) following the exhaustive search. Each optimization procedure, for example, can begin at a frame location determined by a previous procedure and can seek to optimize a match between a model transformation and the frame, regarding at least one model parameter of the frame. The optimization procedures, for example, can be performed at a sub-pixel level, and can be used to perform fine tunings of rotation, scale, and shear of the model transformation to achieve a tight graylevel fitting between the model transformation and the frame. In some implementations, the rotation and affine transformation determined in previous steps may be fixed, or may initially be fixed. Directly after the exhaustive search (step 606), for example, an optimization procedure can be performed with regard to translation, contrast, and optionally, brightness. For example, by varying translation, contrast, and brightness parameters (e.g., using a Newton Search), it may be determined that an improved match between the model transformation and the tracked frame region exists.

As each subsequent optimization procedure is initiated, for example, at least one additional model parameter can be taken into account. For example, a subsequent optimization procedure can additionally be performed in regard to rotation and uniform scale. Another subsequent optimization procedure, for example, can additionally be performed in regard to full affine and appearance model parameters. At least one of the optimization procedures can add a degree of freedom in optimization that includes a constant graylevel offset or a constant graylevel multiplier to pixel values in the transformed model, for example, to enable the tracking process to adapt to different lighting conditions (e.g., lightning flashes, explosions, etc.) that are not part of the reference frames or in-between morphs. By beginning with a subset of parameters and increasing the number of parameters to be considered in subsequent steps, the match between the model transformation and the tracked frame region can be improved through performing the series of steps, for example.

In some implementations, each of the optimization procedures can be performed incrementally. For example, by changing one or more of the parameters (e.g., rotation, scale, shear, translation, contrast, brightness, full affine, appearance model, etc.) by a small degree and recalculating an amount of warp to the transformed model, it may be determined that the match between the model transformation and the tracked frame region can be improved. By incrementally applying smaller and smaller changes to one or more of the parameters, for example, the match may be fine-tuned.

In some implementations, an additional optimization procedure can be performed that allows each of the markers to undergo controlled perturbation beyond the transformed model. For example, the controlled perturbation can include variations of marker locations beyond the transformed model. As another example, the controlled perturbation can include variations of graylevel appearance beyond the transformed model. In some implementations, the controlled perturbation of a marker can be defined by at least one other marker, such as a herding marker. The additional optimization procedure, in performing the controlled perturbation on the marker, takes into account how the controlled perturbation affects the other marker (e.g., the herding marker). In some implementations, the controlled perturbation of a marker can be defined by a weight for a Gaussian prior probability for local marker location deviation. For example, it may be determined that a probable location for a marker may be close to a previously determined location, unless a closer match is found between the model transformation and the tracked frame region at another location.

Under some circumstances, for example, a set of morph images may not encompass all possible marker locations for a particular video sequence. For example, considering a set of morph images associated with mouth movement, the morph images may be suitable for tracking the opening and closing of the mouth, but not movements associated with outlying marker positions (e.g., a sneer or smile). In the present example, a marker position may be positioned such that it leaves a global morph space associated with the set of morph images, within constraints associated with one or more herding markers. For example, image noise and ambiguities may cause the marker to slide away completely if unrestrained by the herding marker(s). By positioning one marker at a time while holding the others fixed, for example, the model shape may be deformed while tracking the region in the frame.

In some implementations, the number of herding markers associated with a tracked marker can be configurable. For example, if the number of herding markers associated with a tracked marker is specified as zero, the tracked marker can move free of local constraints. As another example, if the number of herding markers associated with a tracked marker is specified as one, the tracked marker can move such that its closest neighbor marker position and associated graylevel values in that submask are inside the morph space. As another example, if the number of herding markers associated with a tracked marker is specified as being more than one, the herding markers together are to fit into a shape and appearance model. Although one marker may be moved at a time, for example, the optimization process can take into account whether the movement would correspond to an improved fitting for the herded markers as well as for the tracked markers. For example, a larger mask may more robust to noise than a smaller mask.

In some implementations, a failure in at least one of the optimization procedures can be detected (e.g., by the solver 122). For example, the normalized cross-correlation calculated for a determined location can be compared with the normalized cross-correlation calculated for a previously determined location; if the normalized cross-correlation calculated for the previously determined location suggests a better model fitting, this may be indicative of an optimization failure. As another example, divergence or an increase or decrease in scale may be indicative of model failure. In response to the failure, for example, the process 600 can revert to an intermediate model transformation that was obtained in a directly preceding optimization procedure. In some implementations, the previously determined frame location may be considered as a location match. In some implementations, the process 600 can continue from the reverted model transformation by applying subsequent steps or parameter changes that have not yet been attempted. The optimization procedures, for example, can result in a final model transformation being associated with a final location in the frame. For example, the process 600 can include a step 610 for recording the final model transformation and the final location as an outcome of tracking the region in the frame.

Figure 7:
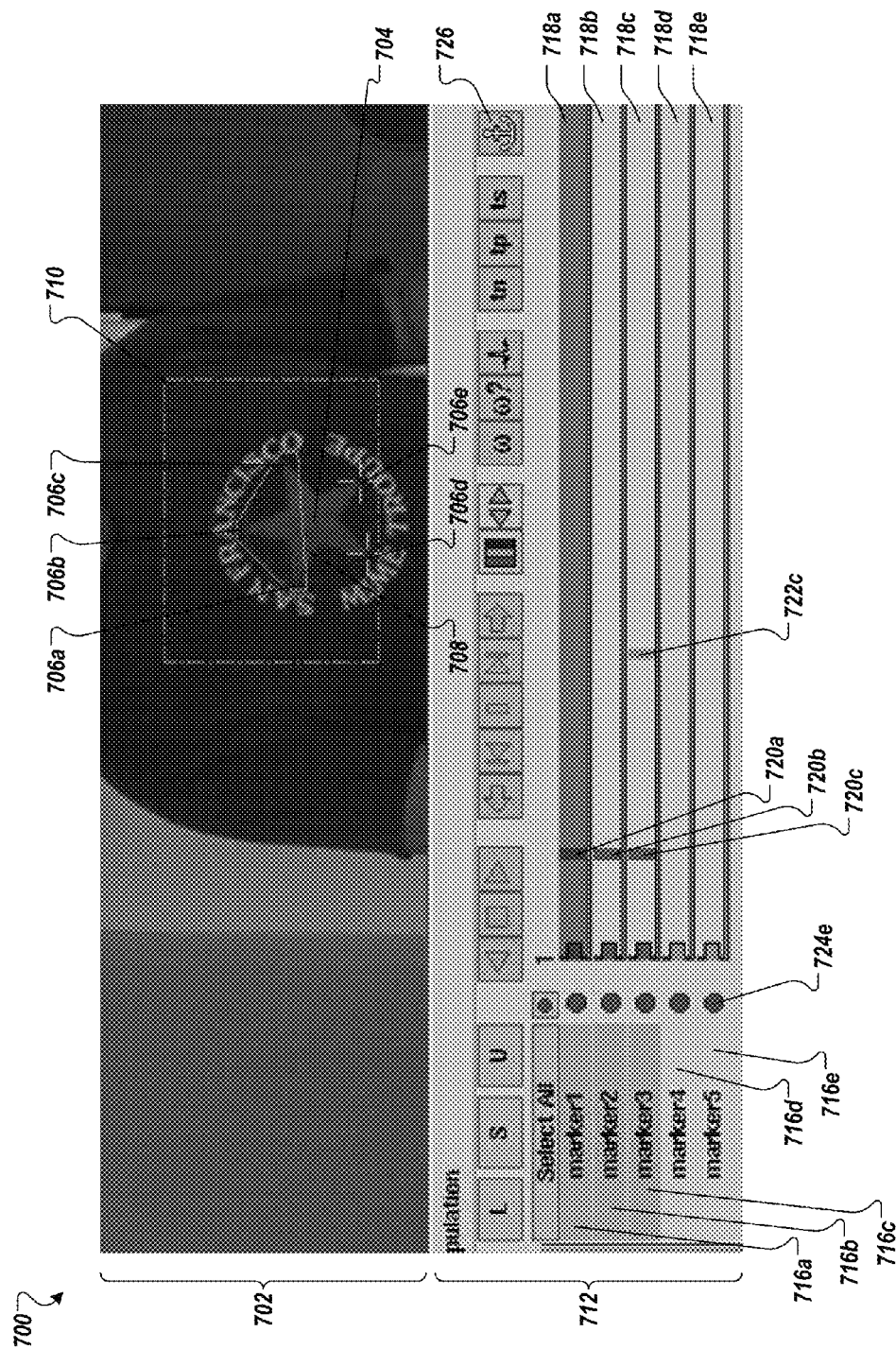
FIG. 7 shows an example of providing control and feedback related to tracking features associated with a video sequence.

FIG. 7 shows an example of providing control and feedback related to tracking features associated with a video sequence. For example, control and feedback can be provided by an interface 700. In some implementations, the interface 700 can be a graphical user interface presented to a user at the video display device 106 (shown in FIG. 1), and user interaction and control can be effected by operation of any of the input devices 104 (also shown in FIG. 1), such as keyboards, computer mice, graphics tablets, and gesture tracking systems, to name a few examples. The interface 700, for example, can be generated by a computer program product tangibly embodied in a computer-readable storage medium (e.g., by the computer system 102, shown in FIG. 1) including instructions that, when executed, generate on the display device 106 the interface 700 for tracking one or more video sequence features.

In some implementations, the interface 700 can include a frame presentation area 702 for displaying one or more frames of the video sequence associated with an image feature 704 (e.g., as shown in FIG. 7, a star, or a portion of the star) to be tracked, and for enabling the user to interact with the frames and images. For example, using any of the input devices 104, the user can position tracking markers 706a-e (e.g., as represented by crosshair patterns) and can associate the markers 706a-e with locations in relation to the image feature 704. Using any of the input devices 104, for example, one or more of the markers 706a-e may be selected by the user. In some implementations, a selected marker can be associated with a different visual representation (e.g., colors, shapes, sizes, etc.) than an unselected marker. In the present example, selected markers 706a-c can be represented by a red color and unselected markers 706d-e can be represented by a green color. New markers can be added by the user, for example by using any of the input devices 104 to indicate marker creation and position.

In some implementations, selected markers can be used for multi-marker tracking of the image feature 704 in the video sequence. For example, the selected markers 706a-c can be associated with a convex hull 708 (e.g., as here represented by a solid orange polygon). The convex hull 708, for example, can be used as a pattern region for performing tracking operations. In the present example, a search area 710 (e.g., as represented by a dashed orange rectangle) can be defined. The search area 710, for example, can be associated with a search area for the selected markers 706a-c, and can represent a maximum amount of marker movement for a step (e.g., a tracking step associated with the process 600, shown in FIG. 6). In some implementations, the user can adjust the search area 710 by using any of the input devices 104.

In some implementations, the interface 700 can include a tracking panel area 712 for interacting with the video sequence and for altering tracking parameters. For example, marker names (e.g., marker1, marker2, marker3, etc.) can be specified and listed. In some implementations, marker selection can be viewed and altered using marker selection controls 716a-e. For example, marker 706a can correspond with marker selection control 716a, marker 706b can correspond with marker selection control 716b, etc. In the present example, selected markers 706a-c can be represented by a green background associated with the corresponding marker selection controls 716a-c. A selection status (i.e., selected or not selected) of any of the markers 706a-e can be altered by the user interacting with the corresponding marker selection controls 716a-e via any of the input devices 104, for example.

In some implementations, a timeline 718a-e can be displayed for each marker 706a-e and can indicate tracking marker reference statuses for each frame in the video sequence. For example, indicators 720c and 722c in the timeline 718c can relate to reference frames associated with the tracking marker 706c. In some implementations, reference frames that can be used for multitracking (i.e., multi-marker tracking) can be visually differentiated from other frames. For example, as shown, the reference frame related to indicators 720a-c can be used for multitracking, as each selected marker 706a-c has a reference on that frame. In the present example, dark gray indicators can be associated with reference frames used for multitracking, and pink indicators can be associated with other reference frames, although other forms of visual differentiation can be used in other implementations. In some implementations, the reference status of a marker can be modified by the user. In the present example, the user can toggle the reference status of a marker (e.g., marker 706e) by interacting with a reference status control (e.g., control 724e) via any of the input devices 104.

In some implementations, a tracked status of a marker can be visually indicated in a timeline. For example, the green region in the timeline 718a indicates that the marker 706a has previously been tracked. As another example, the gray region in the timeline 718b indicates that the marker 706b has not been tracked. In some implementations, an anchored status of a marker can be modified by the user. In the present example, the user can toggle the anchored status of a marker by interacting with an anchor control 726 via any of the input devices 104.

Figure 8:
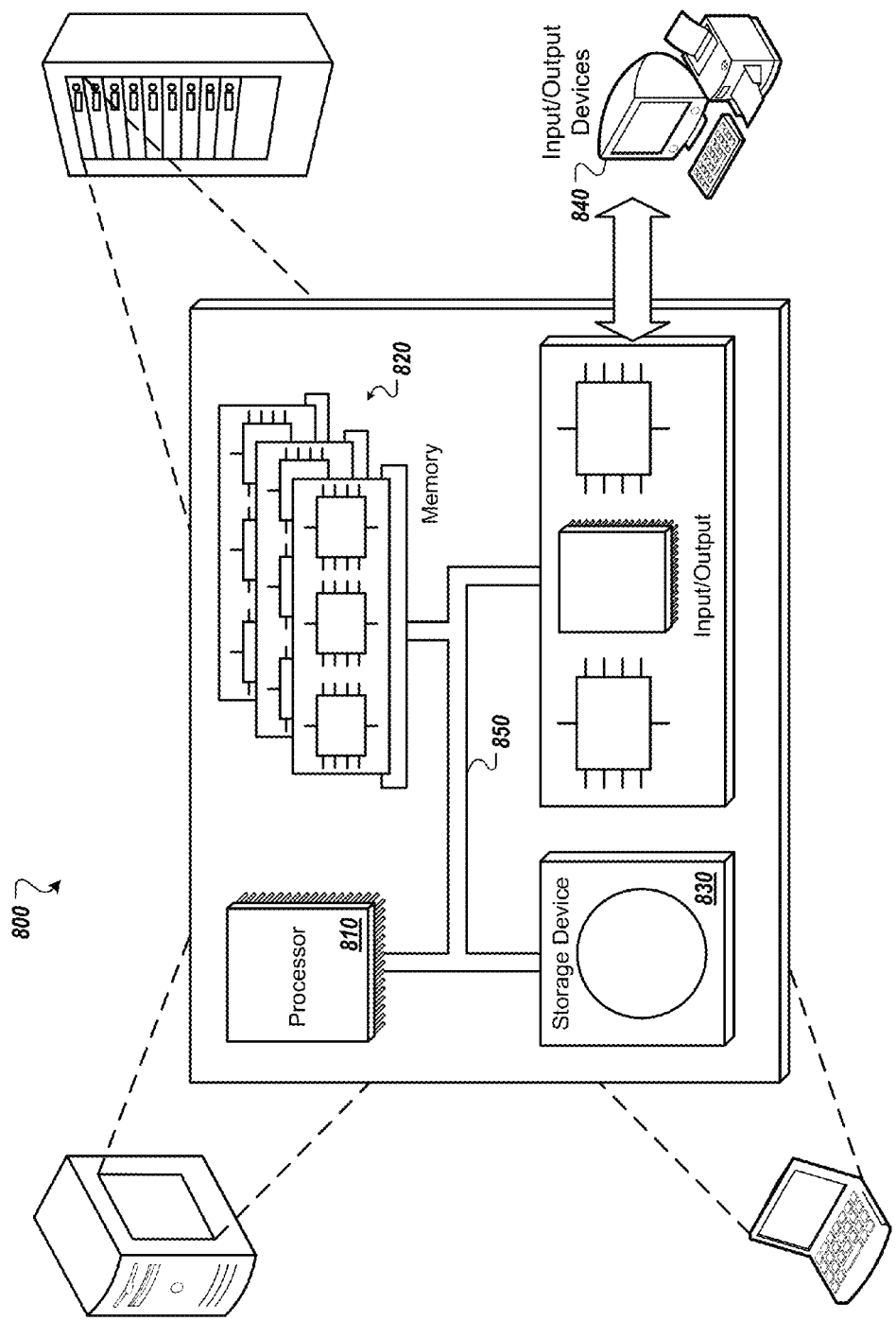
FIG. 8 is a block diagram of a computing system that can be used in connection with computer-implemented methods described in this document.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit in some implementations and is a non-volatile memory unit in other implementations.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A method of tracking a region in a sequence of video images, the method comprising:
   identifying a frame of a video sequence on which to perform region tracking for a region defined using markers in another frame of the video sequence, wherein a model for the region has been generated using the video sequence, the model being based on user-selected positions for the markers in multiple reference frames of the video sequence, and wherein the model includes an average image and multiple component images, the average image representing an average appearance of the region in the reference frames, and each of the component images representing differences between the reference frames and the average image;
   tracking the region in the frame of the video sequence using a multi-pass search that adapts the model to the frame, wherein the multi-pass search associates the model with a first location in the frame and performs a plurality of optimization procedures in an iterative manner seeking to improve a match between a model transformation and the frame to generate a revised model associated with a second location in the frame; and
   recording the revised model transformation and the second location as an outcome of tracking the region in the frame.

2. The method set forth in claim 1 wherein the reference frames used to generate the model reflect the region to be tracked under varying conditions including one or more of lighting, states of the feature and motion blur.

3. The method set forth in claim 1 wherein each of the multiple component images are based on principal component analysis computations.

4. A method of tracking a region in a sequence of video frames, the method comprising:
   identifying a frame of a video sequence on which to perform region tracking for a region defined using markers in another frame of the video sequence, wherein a model for the region has been generated using multiple reference frames of the video sequence selected by a user along with morph images between the reference frames, each morph image representing an intermediate appearance of the region generated at a location among the reference frames selected by: (i) identifying a total number of the morph images to be generated; (ii) computing, for every pair of the reference images, a distance value representing how much the pair of reference images differ with respect to shape change and gray level change; (iii) adding the distance values to form a total distance value; (iv) dividing the total distance value by the total number of the morph images to obtain a per-morph-image distance value; and (v) distributing the morph images among the reference frames based on the distance values and the per-morph-image distance value;

tracking the region in the frame of the video sequence using a multi-pass search that adapts the model to the frame, wherein the multi-pass search associates the model with a first location in the frame and performs a plurality of optimization procedures in an iterative manner seeking to improve a match between a model transformation and the frame to generate a revised model associated with a second location in the frame; and recording the revised model transformation and the second location as an outcome of tracking the region in the frame.

5. The method set forth in claim 4 wherein the reference frames used to generate the model reflect the region to be tracked under varying conditions including one or more of lighting, states of the feature and motion blur.

6. A method of tracking an image feature in a sequence of video frames, the method comprising:

receiving a video sequence comprising a plurality of video frames;

selecting a plurality of reference frames from the plurality of video frames, the plurality of reference frames reflecting the image feature to be tracked under varying conditions;

placing one or more markers on each reference frame to identify a plurality of reference images representing the image feature under the varying conditions;

generating a plurality of morph images from the plurality of reference images, each morph image representing an intermediate appearance of the image feature between consecutive reference images;

generating a model for texture and shape of the image feature from the reference images and the morph images;

tracking the feature in a frame of the video sequence using a multi-pass search that adapts the model to the frame.

7. The method set forth in claim 6 wherein the model includes a mean image and a plurality of component images, each component image representing a difference between an individual reference frame and the mean image.

8. The method set forth in claim 6 wherein generating the model aligns the reference images into a set of aligned images that have a common orientation.

9. The method set forth in claim 6 wherein generating the model warps the reference images to fit a canonical reference image.

10. The method set forth in claim 6 wherein at least one marker in the plurality of markers placed in each reference image is an anchor marker that cannot be modified by subsequent tracking.

11. The method set forth in claim 6 wherein the varying conditions include one or more of lighting conditions, states of the feature and motion blurr.

12. The method set forth in claim 6 further comprising, after generating the model, adding an additional reference frame to the plurality of reference frames, placing one or more markers on the additional reference frame to identify an additional reference image representing the image feature, generating at least one additional morph image based on the additional reference image, and generating a revised model for texture and shape of the image feature from the reference images, the additional reference image, the morph images and the at least one additional morph image.

13. The method set forth in claim 6 wherein the multi-pass search associates the model with a first location in the frame and performs a plurality of optimization procedures in an iterative manner seeking to improve a match between a model transformation and the frame and resulting in a revised model associated with a second location in the frame; and wherein the method further comprises recording the revised model transformation and the second location as an outcome of tracking the region in the frame.

14. A computer program product embodied in a non-transitory computer-readable storage medium and comprising instructions that, when executed by a processor, perform a method comprising:

identifying a frame of a video sequence on which to perform region tracking for a region defined using markers in another frame of the video sequence, wherein a model for the region has been generated using the video sequence, the model being based on user-selected positions for the markers in multiple reference frames of the video sequence, and wherein the model includes an average image and multiple component images, the average image representing an average appearance of the region in the reference frames, and each of the component images representing differences between the reference frames and the average image;

tracking the region in the frame of the video sequence using a multi-pass search that adapts the model to the frame, wherein the multi-pass search associates the model with a first location in the frame and performs a plurality of optimization procedures in an iterative manner seeking to improve a match between a model transformation and the frame to generate a revised model associated with a second location in the frame; and recording the revised model transformation and the second location as an outcome of tracking the region in the frame.

15. The computer program product of claim 14 wherein each of the multiple component images are based on principal component analysis computations.

16. A computer program product embodied in a non-transitory computer-readable storage medium and comprising instructions that, when executed by a processor, perform a method comprising:

identifying a frame of a video sequence on which to perform region tracking for a region defined using markers in another frame of the video sequence, wherein a model for the region has been generated using multiple reference frames of the video sequence selected by a user along with morph images between the reference frames, each morph image representing an intermediate appearance of the region generated at a location among the reference frames selected by: (i) identifying a total number of the morph images to be generated; (ii) computing, for every pair of the reference images, a distance value representing how much the pair of reference images differ with respect to shape change and gray level change; (iii) adding the distance values to form a total distance value; (iv) dividing the total distance value by the total number of the morph images to obtain a per-morph-image distance value; and (v) distributing the morph images among the reference frames based on the distance values and the per-morph-image distance value;

tracking the region in the frame of the video sequence using a multi-pass search that adapts the model to the frame, wherein the multi-pass search associates the model with a first location in the frame and performs a plurality of optimization procedures in an iterative manner seeking to improve a match between a model transformation and the frame to generate a revised model associated with a second location in the frame; and recording the revised model transformation and the second location as an outcome of tracking the region in the frame.

17. The computer program product of claim 16 wherein the reference frames used to generate the model reflect the region to be tracked under varying conditions including one or more of lighting, states of the feature and motion blur.

18. A computer program product embodied in a non-transitory computer-readable storage medium and comprising instructions that, when executed by a processor, perform a method comprising:

receiving a video sequence comprising a plurality of video frames;

selecting a plurality of reference frames from the plurality of video frames, the plurality of reference frames reflecting the image feature to be tracked under varying conditions;

placing one or more markers on each reference frame to identify a plurality of reference images representing the image feature under the varying conditions;

generating a plurality of morph images from the plurality of reference images, each morph image representing an intermediate appearance of the image feature between consecutive reference images;

generating a model for texture and shape of the image feature from the reference images and the morph images;

tracking the feature in a frame of the video sequence using a multi-pass search that adapts the model to the frame.

19. The computer program product of claim 18 wherein the model includes a mean image and a plurality of component images, each component image representing a difference between an individual reference frame and the mean image.

20. The computer program product of claim 18 wherein generating the model aligns the reference images into a set of aligned images that have a common orientation.

21. The computer program product of claim 18 wherein generating the model warps the reference images to fit a canonical reference image.

22. The computer program product of claim 18 wherein at least one marker in the plurality of markers placed in each reference image is an anchor marker that cannot be modified by subsequent tracking.

23. The computer program product of claim 18 wherein the varying conditions include one or more of lighting conditions, states of the feature and motion blurr.

24. The computer program product of claim 18 further comprising, after generating the model, adding an additional reference frame to the plurality of reference frames, placing one or more markers on the additional reference frame to identify an additional reference image representing the image feature, generating at least one additional morph image based on the additional reference image, and generating a revised model for texture and shape of the image feature from the reference images, the additional reference image, the morph images and the at least one additional morph image.

25. The computer program product of claim 18 wherein the multi-pass search associates the model with a first location in the frame and performs a plurality of optimization procedures in an iterative manner seeking to improve a match between a model transformation and the frame and resulting in a revised model associated with a second location in the frame; and wherein the method further comprises recording the revised model transformation and the second location as an outcome of tracking the region in the frame.

* * * * *